Figure 1:
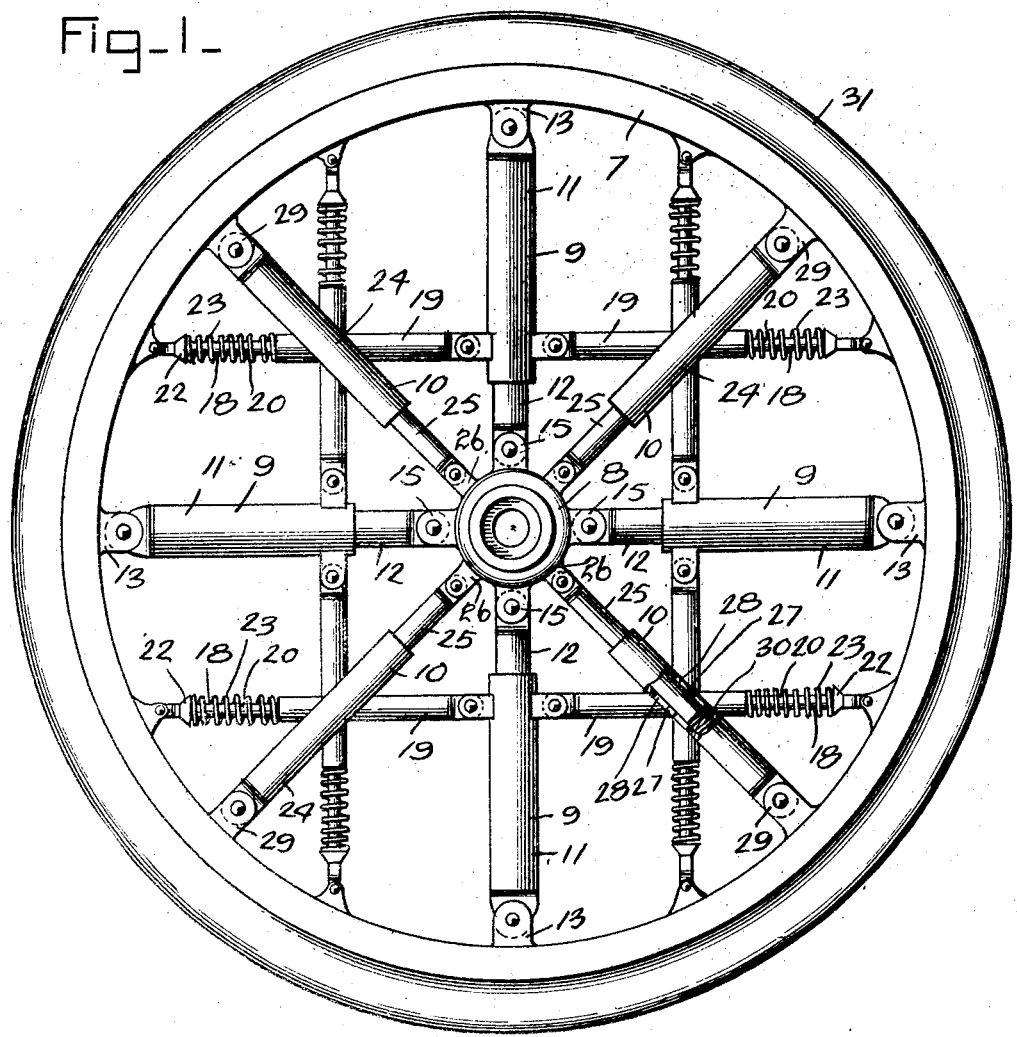

G. A. GUSTAFSON.
SPRING WHEEL.
APPLICATION FILED SEPT. 6, 1907.

911,975.

Patented Feb. 9, 1909.
3 SHEETS—SHEET 1.

Witnesses

Inventor
George A. Gustafson
By
Attorneys

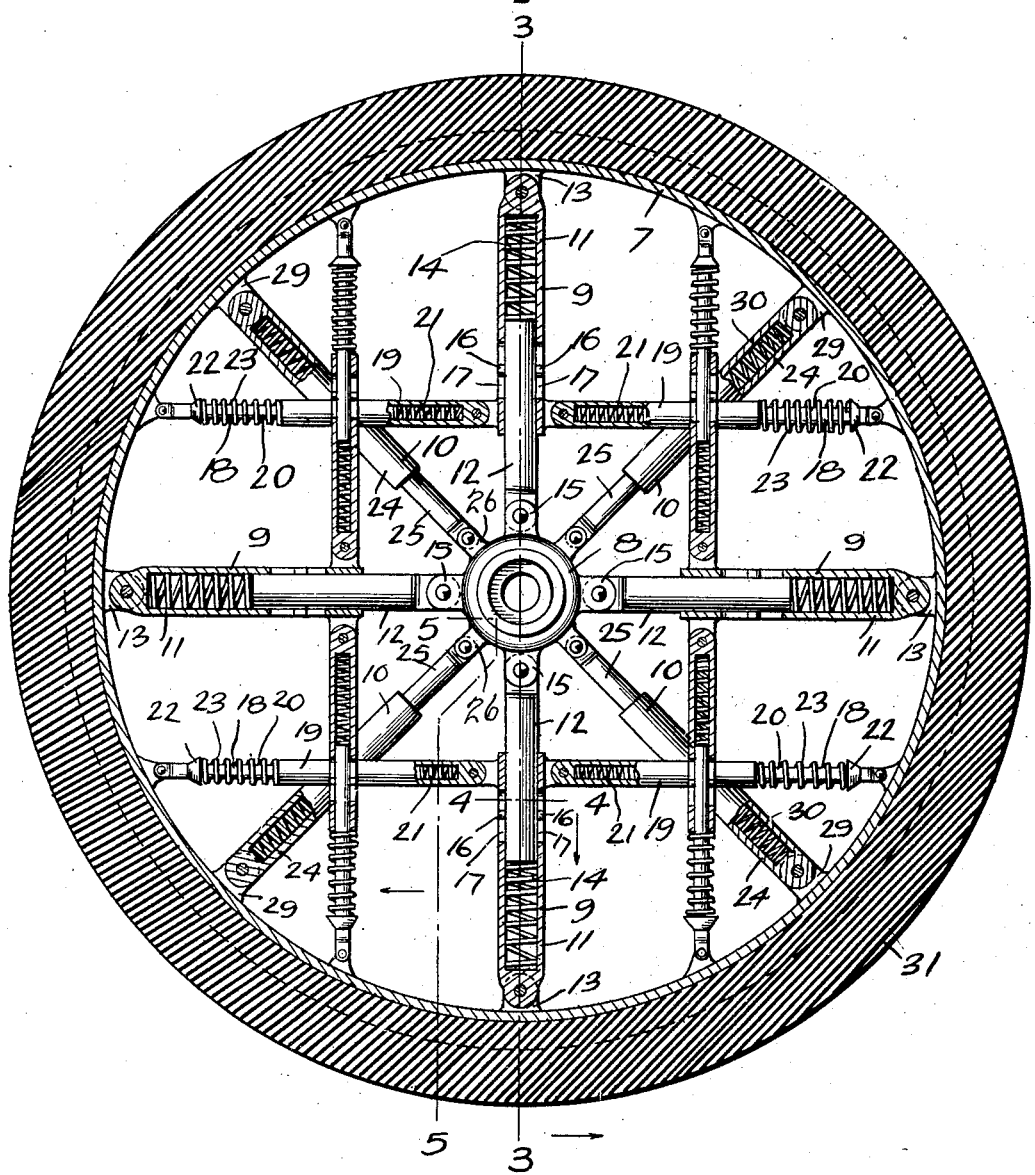

G. A. GUSTAFSON.
SPRING WHEEL.
APPLICATION FILED SEPT. 6, 1907.
911,975.
Patented Feb. 9, 1909.
3 SHEETS—SHEET 3.
Fig_3_
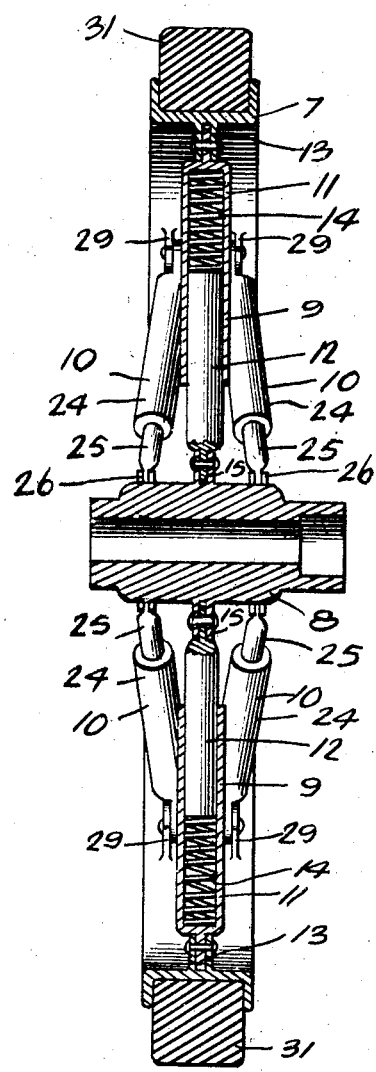
Fig_5_
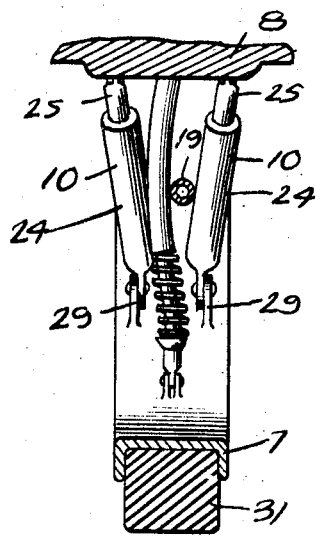

UNITED STATES PATENT OFFICE.

GEORGE A. GUSTAFSON, OF CHURCHS FERRY, NORTH DAKOTA.

SPRING-WHEEL.

No. 911,975.

Specification of Letters Patent.

Patented Feb. 9, 1909.

Application filed September 6, 1907. Serial No. 391,686.

*To all whom it may concern:*

Be it known that I, GEORGE A. GUSTAFSON, a citizen of the United States, residing at Churchs Ferry, in the county of Ramsey, State of North Dakota, have invented certain new and useful Improvements in Spring-Wheels; and I do hereby declare the following to be a full, clear, and exact description of the invention, such as will enable others skilled in the art to which it appertains to make and use the same.

The present invention has reference to improvements in spring wheels designed primarily for use on motor cars, and it aims to provide an exceedingly simple, inexpensive and generally efficient wheel of that type possessed of the requisite lightness, strength, and durability.

To this end the invention, briefly described, resides in the provision of a wheel in which the metallic rim is connected to the hub by four main spokes arranged at right-angles to each other, and by a similar number of pairs of secondary spokes located between the main spokes, each of the several spokes comprising a pair of telescoping members yieldingly held in position with relation to each by means of coil-springs, each of the main spokes being further connected with the rim by a pair of cross-braces disposed on opposite sides thereof and likewise arranged at right-angles thereto.

The invention will be readily understood from a consideration of the following detailed description, and its preferred embodiment is illustrated in the accompanying drawings in which like parts are designated by corresponding reference numerals, throughout the several views.

Figure 4:
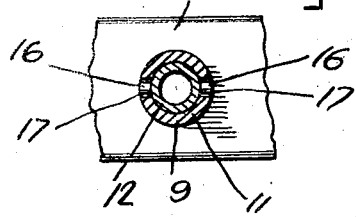

Of the said drawings, Figure 1 is a front elevation of a wheel constructed in accordance with the present invention, Fig. 2 is a vertical section therethrough, Figs. 3, 4, and 5, are sections taken respectively on the lines 3—3, 4—4, and 5—5, of Fig. 2.

Referring more particularly to the drawings, 7 designates the U-shaped steel rim, 8 the hub, and 9 and 10 the main and secondary spokes respectively, which connect the rim and hub, there being four main spokes which are arranged at angles of 90° to each other.

Each of the main spokes consists as shown of a pair of telescoping members 11 and 12, the former of which in each instance is in the nature of a hollow sleeve, which is pivoted at its outer ends between a pair of ears 13 formed on or secured to the under face of the rim, the two members of each main spoke being forced yieldingly apart from each other by means of an expansible coil-spring 14 interposed within the outer members 11 and bearing against the inner end of the member 12 which latter is pivoted at its outer ends between ears 15 formed on the hub. The member 12 of the main spoke is provided in addition, with a transversely-disposed pin 16 which extends at opposite ends through registering slots 17 formed in the corresponding outer member 11. Each of the main spokes is further connected with the steel rim by means of a pair of cross braces 18 which are disposed upon opposite sides thereof and are arranged at right-angles thereto and in alinement with each other. Each cross-brace likewise consists of a pair of telescoping members 19 and 20 yieldingly forced away from each other by expansible coil-springs 21 located within the member 19 thereof and bearing against the inner end of the member 20 which latter has formed thereon a collar 22 between which and the corresponding member 19 a second coil-spring 23 is located, said last-mentioned springs embracing the members 20. The several cross-braces are slightly bowed so as to permit them to cross each other.

The secondary spokes 10 above referred to are arranged in pairs between each pair of main spokes and the members of each of the secondary spokes therefore pass upon opposite sides of the corresponding pair of intersecting braces, as shown. Each of the secondary spokes in like manner consists of a pair of telescoping members 24 and 25 the latter of which is pivotally connected at its outer end to ears 26 formed on the hub and extends at its opposite end into the corresponding member 24, being provided adjacent such point with a transversely disposed pin 27 which extends at opposite ends through registering longitudinal slots 28 formed in the member 24 which latter is likewise pivoted to ears 29 formed on the wheel rim. The members of each secondary spoke are normally forced away from each other by a coil-spring 30 disposed within the member 24.

The U-shaped construction of the wheel rim 7 results in the provision of an annular seat in which a solid rubber tire 31 is disposed.

The pairs of secondary spokes diverge from each other in their passage from the wheel rim to the hub, the hub ears to which said spokes are connected being formed adjacent the opposite face of the latter.

It will be apparent from the foregoing that the members of each of the several spokes are capable of movement towards and from each other by reason of their telescopic connection, thus compensating at all points for the compression of the wheel.

What is claimed, is,

1. In a spring wheel the combination, with a hub and rim of a series of resilient main spokes arranged at right-angles to each other; a pair of alining resilient braces arranged on opposite sides of each main spoke at right-angles thereto, said braces being connected at opposite ends to the rim and to said main spokes; and a pair of resilient secondary spokes disposed between each pair of main spokes, the spokes of each secondary pair diverging from each other in their passage from the rim to the hub, to permit the passage of the cross braces to the rim.

2. In a spring-wheel, the combination, with a hub and rim, of a series of resilient main spokes connecting said parts and arranged at right angles to each other, each spoke comprising a pair of telescoping members, and means for yieldingly forcing the same in opposite directions; a pair of alining resilient braces arranged on opposite sides of each main spoke at right-angles thereto, said braces being connected at opposite ends to the rim and to said main spokes; and a pair of resilient secondary spokes disposed between each pair of spokes, the spokes of each secondary pair diverging from each other in their passage from the rim to the hub, to permit the passage of the cross-braces to the rim.

3. In a spring-wheel, the combination, with a hub and rim, of a series of resilient main spokes connecting said parts and arranged at right angles to each other, each spoke comprising a pair of telescoping members, each outer member being provided with a pair of registering slots, and each inner member with a transverse pin extending at opposite ends therethrough; means located within the outer member of each spoke and bearing against the inner end of the inner member thereof, for yieldingly forcing said members in opposite directions; a pair of alining resilient braces arranged on opposite sides of each main spoke at right-angles thereto, said braces being connected at opposite ends to the rim and to said main spokes; and a pair of resilient secondary spokes disposed between each pair of spokes, the spokes of each secondary pair diverging from each other in their passage from the rim to the hub, to permit the passage of the cross-braces to the rim.

4. In a spring-wheel, the combination, with a hub and rim, of a series of resilient main spokes connecting said parts and arranged at right angles to each other; a pair of alining resilient braces arranged on opposite sides of each main spoke, and at right-angles thereto, each brace comprising a pair of telescoping members, and means for yieldingly forcing the same in opposite directions; and a pair of resilient secondary spokes disposed between each pair of spokes, the spokes of each secondary pair diverging from each other in their passage from the rim to the hub, to permit the passage of the cross-braces to the rim.

5. In a spring-wheel, the combination, with a hub and rim, of a series of resilient main spokes arranged at right-angles to each other; a pair of alining resilient braces arranged on opposite sides of each main spoke at right-angles thereto, said braces being connected at opposite ends to the rim and to said main spokes; and a pair of resilient secondary spokes disposed between each pair of main spokes, the spokes of each secondary pair diverging from each other in their passage from the rim to the hub, to permit the passage of the cross-braces to the rim, each main and secondary spoke, and each brace comprising a pair of telescoping members, and means for yieldingly forcing the same in opposite directions.

In testimony whereof, I affix my signature, in presence of two witnesses.

GEORGE A. GUSTAFSON.

Witnesses:
H. C. HANSEN,
M. ENGELHORN.